S. G. BLESSINGTON AND A. H. COSGROVE.
LACING STUD SETTING MACHINE WITH REINFORCING TAPE THEREFOR.
APPLICATION FILED SEPT. 28, 1917.
1,377,657.
Patented May 10, 1921.
5 SHEETS—SHEET 1.
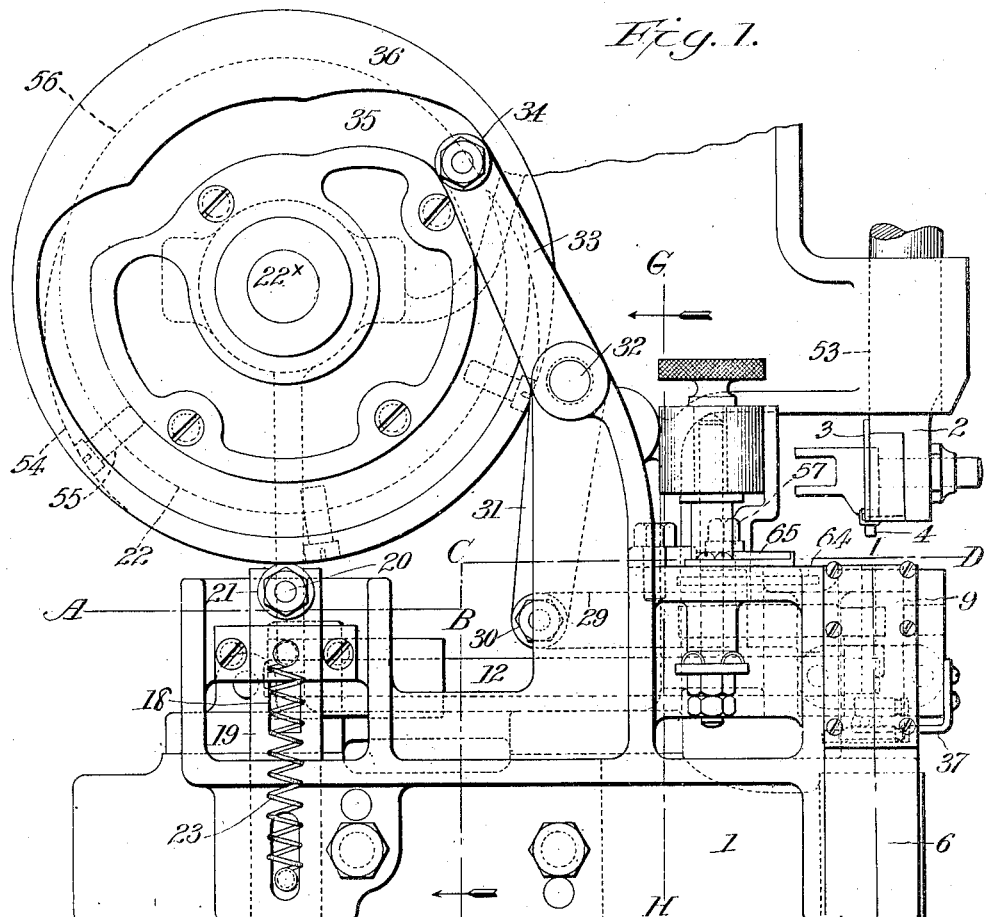
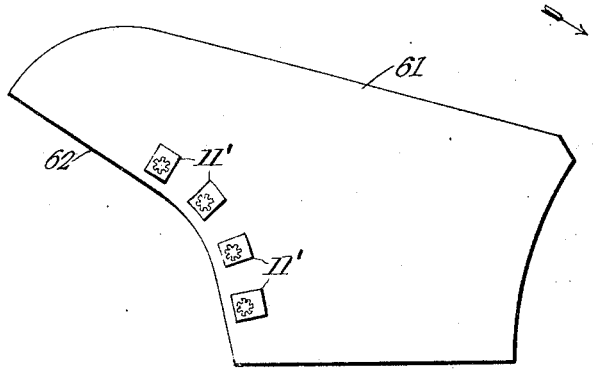
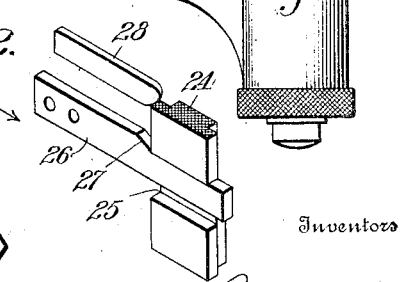
Inventors
Stephen G. Blessington
Augustus H. Cosgrove
by Charles N. Gooding
Attorney

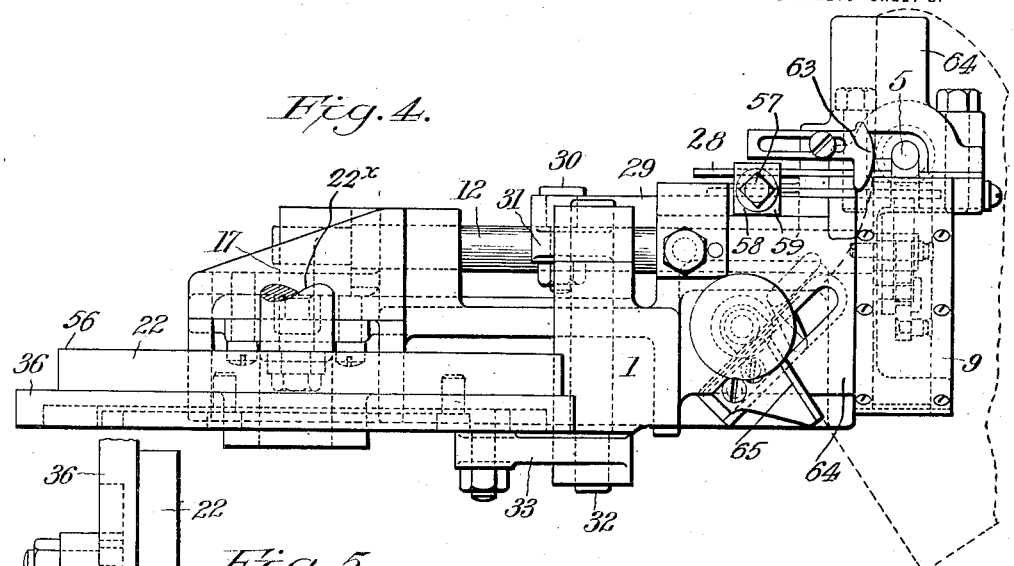
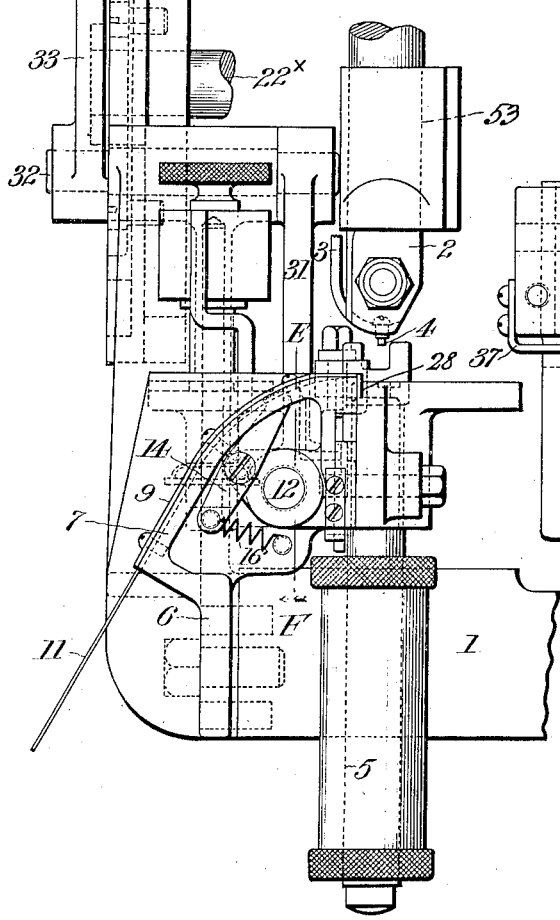
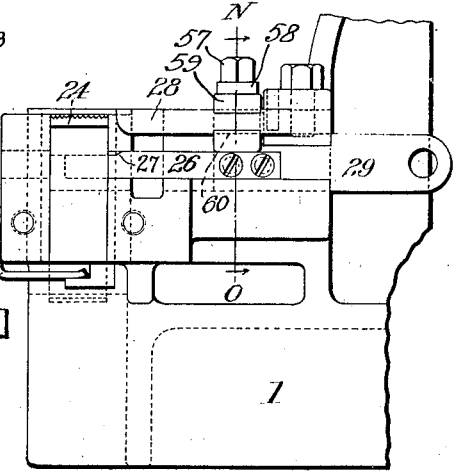

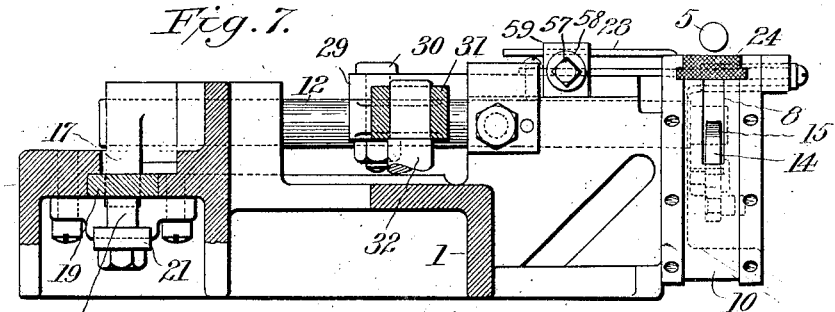
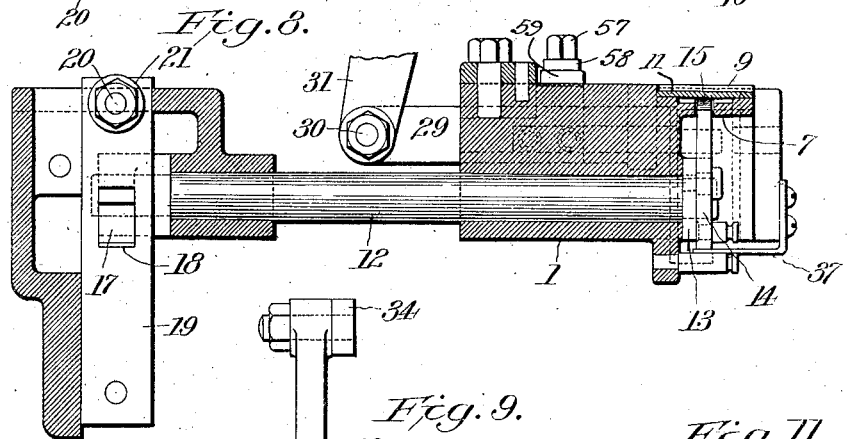
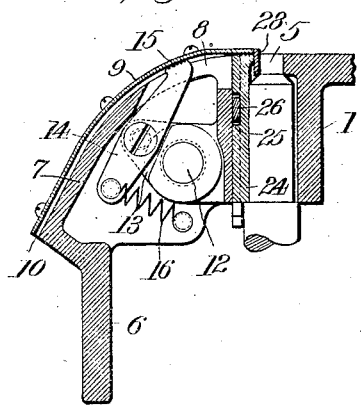
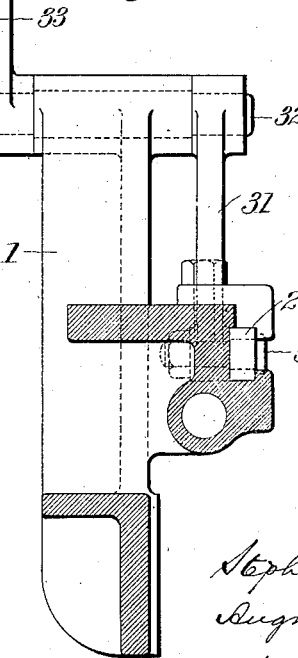
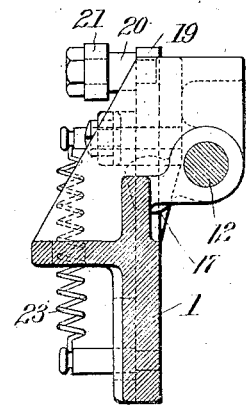

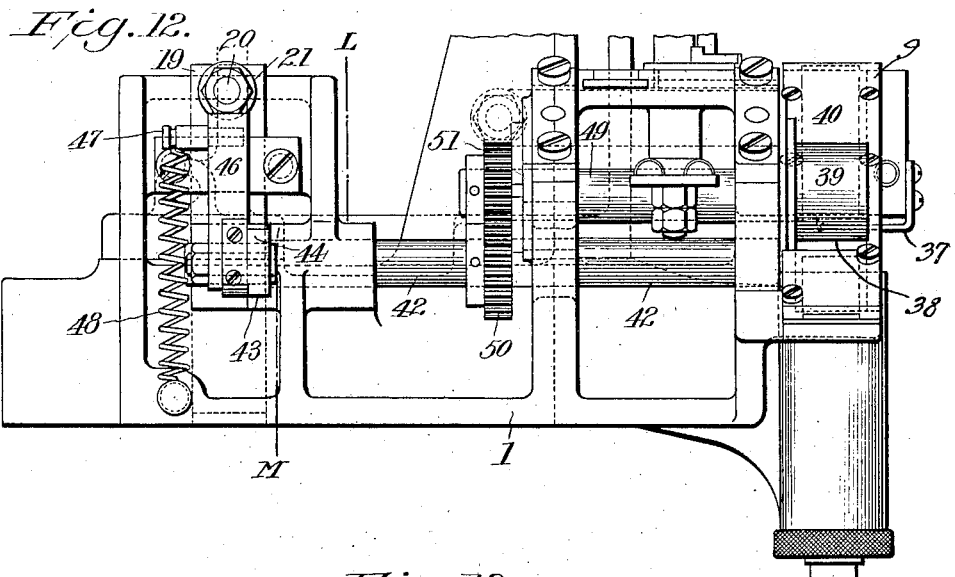
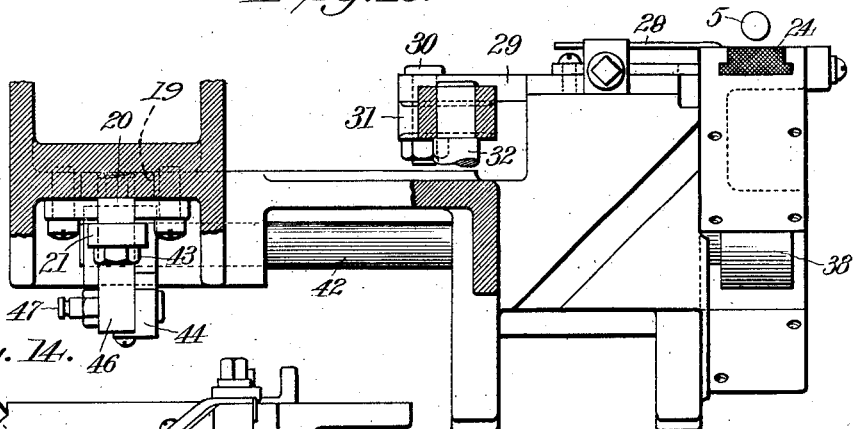
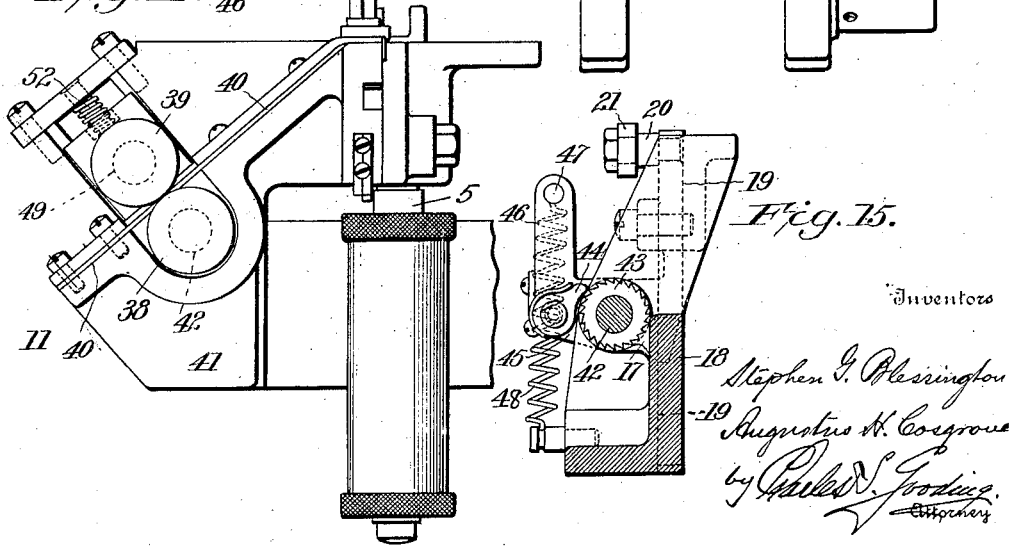

UNITED STATES PATENT OFFICE.

STEPHEN G. BLESSINGTON, OF HAVERHILL, AND AUGUSTUS H. COSGROVE, OF BOSTON, MASSACHUSETTS, ASSIGNORS TO AMERICAN LACING HOOK CO., OF WALTHAM, MASSACHUSETTS, A CORPORATION OF NEW JERSEY.

LACING-STUD-SETTING MACHINE WITH REINFORCING-TAPE THEREFOR.

1,377,657.  Specification of Letters Patent.  Patented May 10, 1921.

Application filed September 28, 1917. Serial No. 193,838.

*To all whom it may concern:*

Be it known that we, STEPHEN G. BLESSINGTON, a citizen of the United States, residing at Haverhill, in the county of Essex and State of Massachusetts, and AUGUSTUS H. COSGROVE, a citizen of the United States, residing at Boston, in the county of Suffolk and State of Massachusetts, have invented new and useful Improvements in Lacing-Stud-Setting Machines with Reinforcing-Tape Therefor, of which the following is a specification.

This invention relates to a machine for setting lacing studs in the uppers of boots and shoes and in reinforcing strips or pieces therefor.

The object of the invention is to provide a machine which will set lacing studs in a shoe upper and in a piece of reinforcing tape simultaneously, the machine being so constructed that it may be utilized so that it may—

First, insert a series of lacing studs in a continuous reinforcing strip and in an upper;

Second, insert a series of lacing studs in a reinforcing strip and an upper and partly sever the reinforcing strip between adjacent studs, so that the strip will more readily conform to the contour of the edge of the upper to which it is attached and prevent buckling of the same;

Third, step by step insert lacing studs in an upper and reinforcing strip and cut off the reinforcing strip after each lacing stud has been set in the upper and in the strip, thus obtaining a series of studs which are set in separate reinforcing pieces to strengthen the upper, although in this latter case the studs are first set in a continuous reinforcing strip and the cutting of the strip takes place after the setting of the stud through the strip and upper.

The machine of this invention is, therefore, adapted for a variety of work to suit different demands.

The object of the invention is, therefore, to provide a machine which will automatically feed a continuous strip of reinforcing tape to a shoe upper and attach it thereto, and which is adapted to be adjusted so as to either leave the strip continuous or to partly sever it between adjacent studs or to entirely sever it between adjacent studs.

By attaching the studs to the upper and to a reinforcing piece, whether the reinforcing piece be divided into a series of sections or whether it be left continuous or whether it be left partly severed, the stud is very much more firmly attached to the upper and is prevented from being detached therefrom under the different conditions of use.

The invention consists in the combination and arrangement of parts set forth in the following specification and particularly pointed out in the claims thereof.

Referring to the drawings:

Figure 1 is a side elevation of a lacing stud setting machine embodying our invention, partly broken away and with the stud feeding mechanism shown in part.

Fig. 2 is a perspective view of the stay strip cutting and gripping mechanism.

Fig. 3 is a plan view of an upper, showing the stay strip applied and divided into separate sections.

Fig. 4 is a plan view, partly broken away and shown in section and illustrating the mechanism for feeding, cutting off and gripping the reinforcing tape.

Fig. 5 is a front elevation partly broken away and omitting a portion of the lacing stud feeding mechanism.

Fig. 6 is a side elevation as viewed from the right of the machine, the same being broken away and illustrating a portion of the mechanism for cutting off the tape and for gripping the same.

Fig. 7 is a sectional plan taken in the plane of A B C D Fig. 1, with the cover of the guideway for the reinforcing tape removed.

Fig. 8 is a sectional elevation taken on line E—F, Fig. 5.

Fig. 9 is a vertical transverse section taken on line G—H, Fig. 1.

Fig. 10 is a sectional elevation on line I—J, Fig. 1.

Fig. 11 is a transverse sectional elevation taken on line C—K, Fig. 1.

Fig. 12 is a partial side elevation illustrating a roller feed mechanism for feeding the stay strip.

Fig. 13 is a horizontal section of the modification illustrated in Fig. 12.

Fig. 14 is a front elevation of the details of the roller feed mechanism, illustrated in Fig. 12.

Fig. 15 is a vertical sectional elevation taken on line L—M of Fig. 12.

Like numerals refer to like parts throughout the several views of the drawings.

Figure 16:
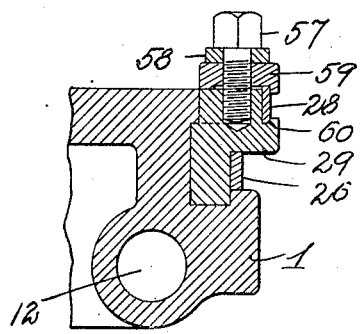
Fig. 16 is a sectional elevation taken on line N—O, Fig. 6.

In the following specification and in the claims "lacing stud" is used to indicate either a lacing hook or an eyelet, as our invention is adapted to be used in setting eyelets as well as lacing hooks, although the drawings illustrate the embodiments of our invention which are particularly adapted to be used in connection with lacing hooks.

The drawings, Figs. 1 to 11 inclusive illustrate one embodiment of our invention and Figs. 12 to 15 inclusive illustrate a modification of our invention, particularly as to the feeding of the strip and upper.

The machine illustrated and described is of that type in which the lacing studs are fed down a raceway which is supported upon and carried by a vertical reciprocatory plunger and are fed to the raceway on said plunger from a hopper which contains the lacing studs in mass and from which they are delivered to the raceway on said plunger, similar in its construction, so far as the feeding of the lacing studs to the upper is concerned, to the machine illustrated in patent issued to John Pierce on February 4, 1902, No. 692,340 entitled "Separator and stop for lacing hook setting machine." As this type of machine is well known to those skilled in the art, the illustration of the hopper and mechanism for feeding the lacing studs to the raceway on the reciprocatory plunger and also the mechanism for imparting a reciprocatory motion to the plunger are omitted, as the specific mechanism for this purpose forms no part of this invention.

Considering first that embodiment of our invention illustrated in Figs. 1 to 11 inclusive of the drawings, 2 is the setting plunger which is adapted to slide in ways 53 in the frame of the machine and to which a vertical reciprocatory motion is imparted by suitable mechanism (not shown in the drawings). A raceway 3 is fastened to the plunger 2 and reciprocates with it. The lacing studs 4 pass down this raceway until the lowermost lacing stud on the raceway occupies the position illustrated in Figs. 1 and 5.

A bracket 6 is fastened to the frame 1 and said bracket is provided with a bed 7 which has a recess 8 extending therethrough, said bed 7 being provided with a slot 10 constituting a way, which is covered by a plate 9, and this plate terminates at its upper end in close proximity to an anvil 5 which is adjustably fastened in a manner well known to those skilled in the art in the frame 1 of the machine. Into the way 10 is fed from any suitable reel or other roll (not shown) a reinforcing tape 11 (Fig. 5) of the proper width to form a stay piece for the lacing studs.

12 is a rock-shaft mounted in suitable bearings on the frame and alongside the bracket 6 and having an arm 13 on which is pivoted a finger 14 having a serrated or roughened end 15 projecting into the recess 8 of the bracket bed 7 and normally pressed toward the plate 9 by means of a spring 16 or other suitable pressure device so as to bite upon the tape 11 as said tape is forced up through the way 10. As the shaft 12 is rocked in one direction the finger 14 is carried down and, by reason of this arrangement, slips upon the tape and when the rock-shaft performs its return movement the eccentricity of the finger is such that it grips the tape and feeds the same forward a length proportionate to the length of the throw of said rock-shaft, thus presenting beneath the plunger 2 and the lowermost lacing stud 4 thereon a length of tape sufficient to receive the lacing stud to be set.

The shaft 12 has an arm 17 fast thereto, the free end of which projects into a slot 18 (Figs. 7 and 8) provided in a vertically arranged slide 19 at the top of which is a stud 20 carrying a roller 21 which has surface contact with a cam plate 54 which is removably fastened by screws 55 to a disk 56, said disk and cam plate 54 forming together a cam 22 which is fastened to a cam-shaft 22×.

The slide 19 is normally held in engagement with the cam 22 by means of a spring 23, and the cam 22 is so constructed and timed as to intermittently depress the slide and consequently the arm 17 and thereby rock the shaft 12 and oscillate the feed finger 14 and an upward movement of the arm 17 is subsequently effected by the spring 23 to accomplish the feeding movement of the tape and the upper which is attached thereto by a lacing stud or lacing studs or the same may feed the stay strip or tape alone when said tape is cut off after each stud has been set to join the tape to the upper, all as will be hereinafter fully described in the general operation of the machine.

When a length of tape has thus been fed forward over the anvil 5 sufficient to receive a lacing stud or hook the same is gripped firmly in position in the guideway 10 and against the plate 9 by a gripper slide 24 preparatory to being severed or partly severed by the cutter, as the case may be. This gripper is shown in Figs. 2, 7 and 10 and consists of a vertical slide plate arranged to slide in ways in the frame 1 alongside the anvil 5 and a vertical reciprocatory motion is imparted to the same by a horizontally movable cam bar 26 which projects into a slot 25 extending transversely of the gripper slide 24, and said cam bar 26 is provided with a cam shoulder 27 which, when said bar is moved in the direction of the arrow (Fig. 2), comes in contact with the upper edge of the slot 25 in the gripper slide and lifts said gripper into gripping contact with the under side of the tape and clamps it against the plate 9, thus holding the previously fed portion in position to receive the lacing stud, and also holding the tape rigidly in position while the feed finger 14 is making its return stroke to engage the tape at another point to feed forward a fresh length for another lacing stud.

While the reinforcing tape is held by the gripper as hereinbefore described, a horizontally sliding knife or cutter 28 is moved forward and severs the fed length of the tape from the main strip, if so desired, or it may partly sever said tape, or it may be so adjusted as not to engage the tape at all.

The knife 28 and the cam bar 26 are secured to a carrier common to both and made as a slide 29. This slide is secured by the stud 30 (Figs. 1, 8 and 9) to one end of the lever 31, the other end of which lever is fast to a rock-shaft 32, and the other end of the rock-shaft 32 has a lever 33 which carries a roller 34 traveling in a cam groove 35 in a cam 36 on the cam shaft 22ˣ. The cam groove 35 is of such contour and arrangement as to impart to the slide 29 the requisite movements in time to actuate the gripper and knife in manner and relative time hereinbefore described.

In order to enable the machine to be adjusted so that the knife 28 may either not engage the tape at all or that it may partly or wholly sever the tape at intervals, said knife 28 is adjustably fastened to the slide 29, as illustrated in Figs. 4, 6, 7 and 16, by a clamping screw 57 which projects through a collar 58 and clamping plate 59 and has screw-threaded engagement with the slide 29. The lower edge of the knife 28 projects into a groove 60 in said slide and is thus held firmly in adjusted position upon said slide 29.

The gripper slide 24 remains in gripping contact with the tape until the knife has performed its function and moved back out of contact therewith. A spring 37 acts to draw the gripper down to its lower position, thereby leaving an open passage for the tape to be fed forward over the anvil for the next lacing stud.

The upper 61 is held with its front edge 62 bearing against the front edge gage 63 (Fig. 4) during the operation of the machine in a manner well known to those skilled in this art.

The feeding of the upper and tape where the two are not separated between each pair of adjacent lacing studs at each rotation of the cam shaft is accomplished by the cam 22, and it will be noted that the cam plate 54 may be removed by removing the screws 55 and cam plates of different throws attached to the cam disk 56 so as to feed the tape and upper a greater or less distance as may be desired to secure different distances between adjacent lacing studs in the upper.

Having thus specifically and to some extent, in general, described the construction and operation of one embodiment of our invention, we will now proceed to describe the general operation of the machine illustrated in Figs. 1 to 11 inclusive. When the same is adjusted to entirely cut off a section of the reinforcing tape after each stud has been set the upper is placed upon the work-supporting portion 64 of the frame, with its front edge 62 resting against the front edge gage 63, and, in the case of a right hand upper, in which the lowermost stud to be set in the upper is set first, with the upper edge of said upper resting against a gage 65. The machine is then started and the reinforcing tape is fed forward from the guideway 10 and above the gripper 24 by the feed finger 14 in the manner hereinbefore described until the proper amount of tape has been fed forward beneath the lacing stud 4 upon the plunger 2. The plunger then descends and drives the shank of the lacing stud through the upper 61 and the reinforcing tape 11 and clenches the same against the anvil 5. During this motion of the plunger the slide 29 is advanced so as to raise the gripper 24 and grip the reinforcing tape against the plate 9 and as soon as this has been accomplished the knife 28 engages the tape and cuts it entirely across, thus removing a section 11′ therefrom. It will be seen by reference to Fig. 5 that the cutting edge of the knife 28 contacts with the adjacent face of the gripper 24 and the end of the plate 9 and that said gripper and plate coact to hold the tape while it is being severed and prevent it from buckling. Said gripper and plate constitute means in the guide for the tape for assisting in severing the tape when desired.

The tape now having been severed the slide 29 moves backwardly, thus withdrawing the knife 28 and moving the cam slide 26 backwardly to allow the gripper 24 to be moved downwardly by the spring 37, thus releasing the reinforcing tape so that it can be fed forward ready to be attached again to the upper by another lacing stud. In this manner of using our invention the upper is fed forward to space the studs by the operator in a manner well known to those skilled in the art, and just before the lacing stud is removed from the lower end of the raceway 3, the plunger with said raceway starts to move upwardly in readiness to descend to insert another lacing stud in the upper and reinforcing tape and clench the same in said reinforcing tape.

It will be observed that the reinforcing tape is fed lengthwise of the edge of the upper and in the line of movement of the upper while successive studs are set therein, and in this particular manner of using our invention there is an individual or independent stay piece for each one of the lacing studs.

Before the gripper 24 is released or moved downwardly, as hereinbefore described, the feed finger 14 is moved backwardly in order to secure a new grip upon the reinforcing tape when it is time to feed the same forward to receive another lacing stud.

Figure 17:
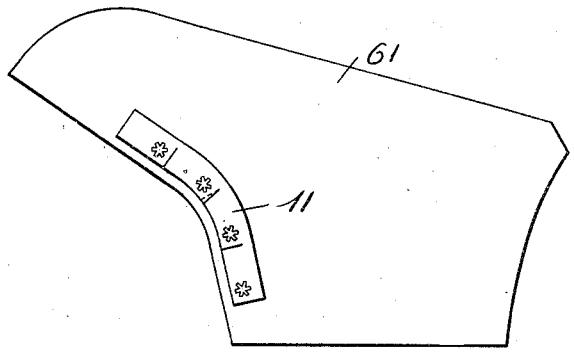
Fig. 17 is a plan view of an upper with a reinforcing strip attached thereto by lacing studs and the strip partially severed.
Figure 18:
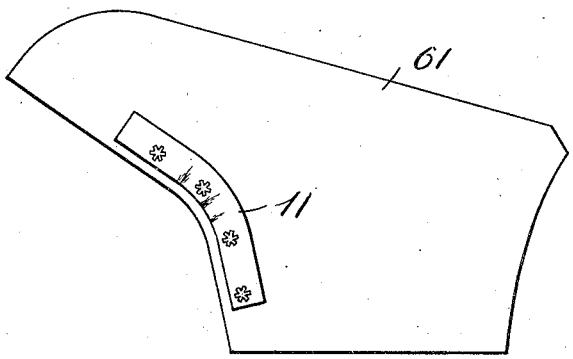
Fig. 18 is a plan view of an upper with a reinforcing strip attached thereto by lacing studs, said reinforcing strip being severed only at its ends.

When it is desired to partially sever the tape 11 at intervals and between adjacent lacing studs as illustrated in Fig. 17, the knife 28 is adjusted backwardly from the position which it occupies when it entirely severs the reinforcing tape, this adjustment being performed by loosening the clamp screw 57, sliding the knife 28 backwardly the proper amount and then clamping it in position by tightening up the screw 57 and the plate 59.

When it is desired to affix the reinforcing tape 11 to the upper without cutting it with the knife at all, the knife is moved back sufficiently to clear the tape 11 when the slide 29 is in its forward position, and the tape is severed by the operator when the required number of studs have been set.

It is evident that both in the case of the reinforcing tape being partly severed and in the case where it is not severed at all except at its opposite ends, the finger 14 will feed the strip as described to the first position hereinbefore described, then after the strip has been attached to the upper by means of a lacing stud the next feeding movement of the finger 14 will carry forward not only the strip but also the upper to which it is attached by said lacing stud and different distances may be obtained between the adjacent studs by changing the clamp plates 54 as hereinbefore described.

As shown in Figs. 12 to 15 inclusive, the finger feed mechanism for feeding the stay-strip or tape may be replaced by rollers. There are two rollers, 38 and 39, arranged upon opposite sides of a guideway 40 in the bracket 41. The lower roller 38 has on its shaft 42 a ratchet wheel 43 with which coöperates a spring pawl 44, and this spring pawl is carried on one end of an arm 45 pivoted on the said shaft, this arm having an elbow 46 which is provided with a post 47 to which is attached a spring 48, and the other end of the arm 45 projects into the slot 18 of the slide 19, which is operated substantially as in the example first described.

The shafts 42 and 49 of the rollers 38 and 39, respectively, (see Fig. 12,) are connected by means of gear-wheels 50 and 51, and the roller 39 is mounted in a spring housing 52, Fig. 14.

The general operation of the machine in this embodiment of our invention is substantially the same as that hereinbefore described relating to that embodiment of our machine which is illustrated in Figs. 1 to 11 inclusive, except that the reinforcing tape or stay strip is fed by rollers.

Having thus described our invention, what we claim and desire by Letters Patent to secure is:

1. In a lacing stud setting machine, the combination, with a guide for a continuous reinforcing strip to prevent its lateral displacement in both directions and direct the same to the work, of step by step means for advancing the strip through said guide, and means independent of said strip advancing means for attaching said strip to the work by the setting of a plurality of studs at intervals through a length of said strip when advanced to the work, said strip advancing means being adapted to feed the work by the strip.

2. In a lacing stud setting machine, the combination, with a guide for a continuous reinforcing strip to prevent its lateral displacement in both directions and direct the same to the work, of means for attaching said strip to the work by the setting of a plurality of studs at intervals through a length of said strip when advanced to the work and means independent of said attaching means for feeding, both said work and strip simultaneously after each setting operation.

3. In a lacing stud setting machine, means for feeding the work and a reinforcing strip attached thereto an equal distance and simultaneously by engagement with said strip, means for setting studs through both the strip and the work for attaching the two together, and means whereby the strip may be partially severed transversely at intervals.

4. In a lacing stud setting machine, means for feeding the work and a reinforcing strip attached thereto an equal distance and simultaneously by engagement with said strip, means for setting a plurality of studs through both the strip and the work for attaching said strip to the work and means for cutting said strip transversely thereof.

5. In a lacing stud setting machine, means for setting studs in a shoe upper and in a continuous reinforcing strip therefor, means to feed said continuous reinforcing strip and thereby feed said shoe upper and means for partly severing said strip at intervals when desired.

6. In a lacing stud setting machine, means for inserting a stud in both a reinforcing strip and a shoe upper, and means to subsequently impart a step by step movement to said strip whereby a step by step feeding movement is imparted to said upper by means of said strip.

7. In a lacing stud setting machine, a guide for a continuous reinforcing strip to prevent its lateral displacement in both directions and direct the same to the work, means for inserting a stud in both a reinforcing strip and a shoe upper and means to impart a step by step feeding movement to said strip and thereby to said upper, said strip being secured to the upper by the setting of a plurality of studs through both.

8. In a lacing stud setting machine, means for setting studs, means for guiding a strip of reinforcing tape to a shoe upper and means adapted to feed said strip and thereby the upper, the latter being secured to the upper by the setting of studs through both.

9. In a lacing stud setting machine, means for setting studs, means for guiding a strip of reinforcing tape to a shoe upper, means to feed said strip and thereby the upper, the latter being secured to the upper by the setting of studs through both, and means in said guide for assisting in partially severing the strip when desired.

10. In a lacing stud setting machine, means for guiding a strip of reinforcing tape to a shoe upper, means for securing said strip to said upper by the setting of studs through both, means to feed said strip and thereby the upper, and means for partially severing the strip.

11. In a lacing stud setting machine, means for setting studs in both a reinforcing strip and a shoe upper, means independent of said stud setting means to impart a step by step feeding movement to said strip and upper and adjustable severing means for partially severing the strip as desired.

12. In a lacing stud setting machine, means for guiding a strip of reinforcing tape to a shoe upper, means for securing said strip to the upper by the setting of studs through both, means for feeding said strip and thereby said upper step by step, means in said guide for assisting in partially severing the strip when desired, and means for holding said strip after being partially severed while the feeding means return to engage the same.

13. In a lacing stud setting machine, means for inserting a stud in both a reinforcing strip and a shoe upper, means to subsequently impart a step by step movement to said strip, whereby a step by step feeding movement is imparted to said upper by means of said strip, and means for partly severing the strip.

14. A machine for setting lacing studs in the upper of a boot or shoe and in a reinforcing piece therefor having, in combination, means for guiding a reinforcing strip to the upper of said boot or shoe, mechanism to set a stud in said upper and reinforcing strip, whereby the same are joined together, and means to sever said strip after it is attached to said upper by said stud.

15. A machine for setting lacing studs in the upper of a boot or shoe and in a reinforcing piece therefor having, in combination, means for guiding a reinforcing strip to the upper of said boot or shoe, mechanism to set a stud in said upper and reinforcing strip whereby the same are joined together and means to cut said strip adjacent to said stud after it is attached to said upper by said stud.

16. A machine for setting lacing studs in the upper of a boot or shoe and in a reinforcing piece therefor having, in combination, means for guiding a reinforcing strip to the upper of said boot or shoe, mechanism to set a stud in said upper and reinforcing strip whereby the same are joined together and means movable in a direction substantially parallel to the face of said upper to cut said strip transversely thereof at one side of said stud.

17. A machine for setting lacing studs in the upper of a boot or shoe and in a reinforcing piece therefor having, in combination, means for guiding a reinforcing strip to the upper of said boot or shoe, mechanism to set a stud in said upper and reinforcing strip whereby the same are joined together and means independent of said stud setting mechanism to feed said reinforcing strip and upper after the setting of said stud, to position the same for another stud to be set therein.

18. A machine for setting lacing studs in the upper of a boot or shoe and in a reinforcing piece therefor having, in combination, means for guiding a reinforcing strip to the upper of said boot or shoe, mechanism to set a series of studs in said upper and reinforcing strip and mechanism independent of said stud setting mechanism adapted to feed said strip and the upper attached thereto step by step to properly space said studs.

19. A machine for setting lacing studs in the upper of a boot or shoe and in a reinforcing strip therefor having, in combination, means for guiding a reinforcing strip to the upper of said boot or shoe, mechanism to set a series of studs in said upper and reinforcing strip, mechanism independent of said stud setting mechanism adapted to feed said strip and the upper attached thereto step by step to properly space said studs and means to partially sever said reinforcing strip.

20. A machine for setting lacing studs in the upper of a boot or shoe and in a reinforcing piece therefor having, in combination, means for guiding a reinforcing strip to the upper of said boot or shoe, mechanism to set a stud in said upper and reinforcing strip whereby the same are joined together, means to grip said reinforcing strip, and means to sever the applied portion of said strip from said strip between said gripping means and said attached lacing stud.

21. A machine for setting lacing studs in the upper of a boot or shoe and in a reinforcing piece therefor having, in combination means for guiding a reinforcing strip to the upper of said boot or shoe, mechanism adapted to set a series of studs in said upper and reinforcing strip whereby the same are joined together, means adapted to impart a step by step feeding movement to said reinforcing strip and upper, means to grip said reinforcing strip after each of said studs has been set and means to partly sever said reinforcing strip adjacent to said gripping means after each of said studs has been set.

22. In a machine for setting lacing-hooks, means for feeding and setting the hooks, one at a time, combined with a stay-strip feeding mechanism independent of said hook feeding and setting means for advancing the stay-strip to each successive lacing hook as it is set and holding the strip at each advance until the hook is set.

23. In a machine for setting lacing hooks, means for feeding and setting the lacing hooks, combined with a stay-strip feeding mechanism arranged to feed the stay-strip substantially parallel to the edge of the upper in which the lacing hooks are set, and means independent of the stay strip feeding mechanism to sever the strip at each individual hook.

24. In a machine for setting lacing hooks, means for feeding and setting the hooks, combined with a stay-strip feeding mechanism comprising means to advance the strip periodically in regulated lengths to a position beneath the hook to be set, means to grip and hold the strip so fed, and means to sever the portion of the strip beneath the hook from the body of the strip after the hook is set.

25. In a machine for setting lacing hooks, means for feeding and setting the hooks, combined with a stay-strip feeding mechanism comprising means to advance the strip periodically in regulated lengths to a position beneath the hook to be set, means to grip and hold the strip as fed, means to sever the portion of the strip beneath the hook from the body of the strip after the hook is set, and means to release the gripping mechanism and simultaneously retract the cutting mechanism.

26. In a machine for setting lacing hooks, a hook-feeding mechanism and a setting mechanism, combined with a stay-strip feeding mechanism, a reciprocating gripper independent of said stay-strip feeding mechanism to hold the said strip in fed position while being cut, a reciprocating cutter, and a carrier for the gripper operating device and the cutter.

27. In a machine for setting lacing hooks, a hook-feeding mechanism, and a hook setting mechanism, combined with a stay-strip feeding mechanism, a reciprocating gripper for gripping the fed strip, a cam-bar for operating said gripper, a knife, a common carrier for the cam-bar and knife, and means to reciprocate the said carrier.

28. In a machine for setting lacing-hooks, a hook-feeding mechanism and a hook setting mechanism, combined with a stay-strip feeding mechanism comprising a finger, a rock-shaft with which the finger is connected and by which it is actuated to feed the strip step by step, a gripper for holding the strip in fed position, and a knife for severing the fed portion from the body of the strip.

29. In a machine for setting lacing hooks, a hook-feeding mechanism and a hook setting mechanism, combined with a stay-strip feeding mechanism, having an intermittent feed motion, a gripper for holding the strip after being fed forward and preventing it from drawing back or buckling while being cut off, and a knife to cut off the fed portion of the strip just after the hook is set.

In testimony whereof we have hereunto set our hands in presence of two subscribing witnesses.

STEPHEN G. BLESSINGTON.
AUGUSTUS H. COSGROVE.

Witness to Stephen G. Blessington:
FRED R. SMITH.
Witness to Augustus H. Cosgrove:
EDWARD L. STEPHENS.